United States Patent
Liu et al.

(10) Patent No.: US 7,675,707 B1
(45) Date of Patent: Mar. 9, 2010

(54) DISK DRIVE EMPLOYING REPEATABLE DISTURBANCE COMPENSATION FOR FLY HEIGHT CONTROL

(75) Inventors: Hain-Ling Liu, San Jose, CA (US); Min Chen, San Leandro, CA (US); Soo-Choon Kang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/275,989

(22) Filed: Nov. 21, 2008

(51) Int. Cl.
*G11B 21/02* (2006.01)
(52) U.S. Cl. .................................................... 360/75
(58) Field of Classification Search ............... None
See application file for complete search history.

(56) References Cited

U.S. PATENT DOCUMENTS

| | | | |
|---|---|---|---|
| 4,775,902 A | 10/1988 | Trovato et al. | |
| 4,777,544 A | 10/1988 | Brown et al. | |
| 4,839,754 A | 6/1989 | Gami et al. | |
| 5,130,866 A | 7/1992 | Klaassen et al. | |
| 5,168,413 A | 12/1992 | Coker et al. | |
| 5,594,595 A | 1/1997 | Zhu | |
| 5,742,446 A | 4/1998 | Tian et al. | |
| 5,909,330 A | 6/1999 | Carlson et al. | |
| 5,949,605 A * | 9/1999 | Lee et al. ............. | 360/77.04 |
| 6,008,640 A | 12/1999 | Tan et al. | |
| 6,052,243 A | 4/2000 | Shimada | |
| 6,097,559 A | 8/2000 | Ottesen et al. | |
| 6,175,456 B1 | 1/2001 | Yun | |
| 6,191,901 B1 | 2/2001 | Carlson et al. | |
| 6,268,976 B1 | 7/2001 | Carlson et al. | |
| 6,288,856 B1 | 9/2001 | Ottesen et al. | |
| 6,310,740 B1 | 10/2001 | Dunbar et al. | |
| 6,417,981 B1 | 7/2002 | Smith | |
| 6,452,735 B1 | 9/2002 | Egan et al. | |
| 6,459,539 B1 | 10/2002 | Carlson et al. | |
| 6,493,169 B1 | 12/2002 | Ferris et al. | |
| 6,501,606 B2 | 12/2002 | Boutaghou et al. | |
| 6,519,102 B1 | 2/2003 | Smith et al. | |
| 6,608,727 B2 | 8/2003 | Ottesen et al. | |
| 6,611,389 B1 | 8/2003 | Liu et al. | |
| 6,624,957 B1 | 9/2003 | Yun | |
| 6,671,110 B2 | 12/2003 | Baba et al. | |
| 6,674,590 B2 | 1/2004 | Ottesen et al. | |
| 6,700,724 B2 | 3/2004 | Riddering et al. | |
| 6,717,764 B2 | 4/2004 | Lake | |
| 6,735,027 B2 | 5/2004 | Helsel et al. | |
| 6,762,899 B2 | 7/2004 | Ottesen et al. | |
| 6,765,745 B2 | 7/2004 | Smith et al. | |
| 6,785,081 B2 | 8/2004 | Chapin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,865,040 B2 | 3/2005 | Fayeulle et al. | |
| 6,894,854 B1 | 5/2005 | Carlson et al. | |

(Continued)

*Primary Examiner*—K. Wong
(74) *Attorney, Agent, or Firm*—Howard H. Sheerin, Esq.

(57) ABSTRACT

A disk drive is disclosed comprising a disk, a head actuated over the disk, and control circuitry operable to generate a fly height control signal. A fly height of the head is measured, and the measured fly height is combined with a target fly height and a feedforward signal, wherein the feedforward signal is generated according to:

$$a_1 \cdot \cos(2\pi n_1 k/N) + b_1 \cdot \sin(2\pi n_1 k/N)$$

where $a_1$ and $b_1$ are coefficients and $2\pi n_1 k/N$ represents a frequency of a repeatable disturbance in the fly height of the head.

20 Claims, 3 Drawing Sheets

U.S. PATENT DOCUMENTS

| | | |
|---|---|---|
| 6,930,844 B2 | 8/2005 | Yeh et al. |
| 6,980,383 B2 | 12/2005 | Brunnett et al. |
| 7,016,131 B2 | 3/2006 | Liu et al. |
| 7,023,647 B2 | 4/2006 | Bloodworth et al. |
| 7,038,875 B2 | 5/2006 | Lou et al. |
| 7,046,463 B2 | 5/2006 | Gay Sam et al. |
| 7,068,449 B2 | 6/2006 | Riddering et al. |
| 7,068,451 B1 | 6/2006 | Wang et al. |
| 7,068,457 B2 | 6/2006 | Riddering et al. |
| 7,092,195 B1 | 8/2006 | Liu et al. |
| 7,095,578 B2 | 8/2006 | Ma |
| 7,158,325 B1 | 1/2007 | Hu et al. |
| 7,180,692 B1 | 2/2007 | Che et al. |
| 7,265,933 B1 | 9/2007 | Phan et al. |
| 7,376,182 B2 | 5/2008 | Kris |
| 2002/0167745 A1 | 11/2002 | Ottesen |
| 2003/0002183 A1 | 1/2003 | Fioravanti |
| 2003/0184899 A1 | 10/2003 | Gay Sam et al. |
| 2003/0184907 A1 | 10/2003 | Li et al. |
| 2003/0218813 A1 | 11/2003 | Dakroub |
| 2004/0075940 A1 | 4/2004 | Bajorek et al. |
| 2005/0128630 A1 | 6/2005 | Huang et al. |
| 2006/0268445 A1 | 11/2006 | Brannon et al. |
| 2007/0127148 A1 | 6/2007 | Yokohata et al. |

* cited by examiner

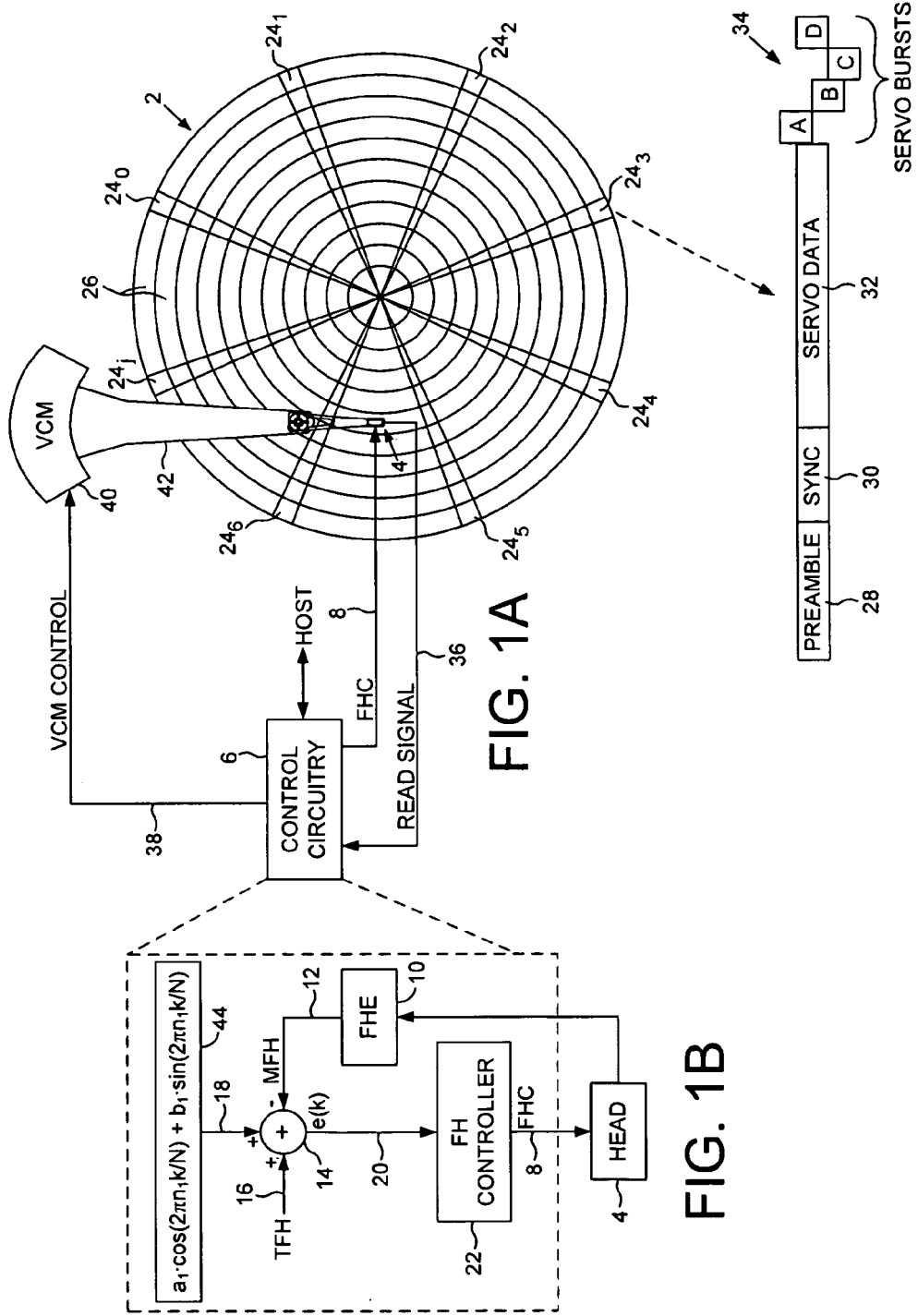

$$a_1(k+1) = a_1(k) - g_1 \cdot e(k) \cdot \cos(2\pi n_1 k/N)$$
$$b_1(k+1) = b_1(k) - g_1 \cdot e(k) \cdot \sin(2\pi n_1 k/N)$$

FIG. 2A $$a_1(k+1) = a_1(k) - g_1 \cdot e(k) \cdot \cos(2\pi n_1 k/N + \phi_1)$$
$$b_1(k+1) = b_1(k) - g_1 \cdot e(k) \cdot \sin(2\pi n_1 k/N + \phi_1)$$

FIG. 2B $$a_2(k+1) = a_2(k) - g_2 \cdot e(k) \cdot \cos(2\pi n_2 k/N)$$
$$b_2(k+1) = b_2(k) - g_2 \cdot e(k) \cdot \sin(2\pi n_2 k/N)$$

$$a_2(k+1) = a_2(k) - g_2 \cdot e(k) \cdot \cos(2\pi n_2 k/N + \phi_2)$$
$$b_2(k+1) = b_2(k) - g_2 \cdot e(k) \cdot \sin(2\pi n_2 k/N + \phi_2)$$

DISK DRIVE EMPLOYING REPEATABLE DISTURBANCE COMPENSATION FOR FLY HEIGHT CONTROL

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk, and control circuitry for generating a fly height control signal.

FIG. 1B shows example control circuitry according to an embodiment of the present invention wherein a measured fly height is combined with a target fly height and a feedforward signal.

FIG. 1C shows a format of a servo sector recorded on the disk.

FIG. 2A shows an equation according to an embodiment of the present invention for adapting the coefficients for generating the feedforward signal.

FIG. 2B shows an alternative equation according to an embodiment of the present invention for adapting the coefficients for generating the feedforward signal.

DETAILED DESCRIPTION OF EMBODIMENTS OF THE INVENTION

Figures 3A, 3B, 3C:
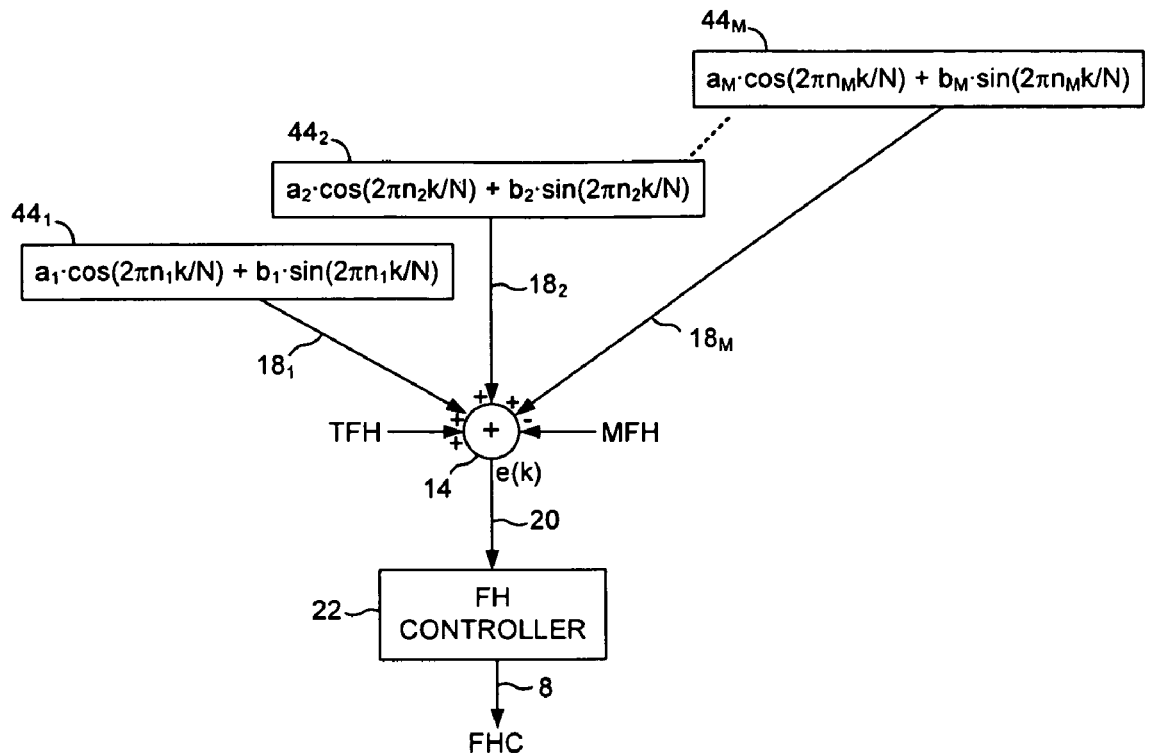
FIGS. 3A-3C show an embodiment of the present invention wherein multiple feedforward signals are generate corresponding to a plurality of repeatable disturbance frequencies in the fly height of the head.

FIG. 1A shows a disk drive according to an embodiment of the present invention comprising a disk 2, a head 4 actuated over the disk 2, a fly height controller 22 for controlling a fly height of the head over the disk 2, and control circuitry 6 operable to generate a fly height control signal (FHC) 8, including the control circuitry shown in FIG. 1B. A fly height of the head 4 is measured using a suitable fly height estimator (FHE) 10, and the measured fly height (MFH) 12 is combined 14 with a target fly height (TFH) 16 and a first feedforward signal 18, wherein the first feedforward signal is generated according to:

$$a_1 \cdot \cos(2\pi n_1 k/N) + b_1 \cdot \sin(2\pi n_1 k/N)$$

where $a_1$ and $b_1$ are coefficients and $2\pi n_1 k/N$ represents a frequency of a first repeatable disturbance in the fly height of the head 4. In an embodiment disclosed below, the coefficients $a_1$ and $b_1$ are initialized to nominal values (e.g., determined for a family of disk drives) and then adapted within each disk drive toward optimal values.

In the embodiment of FIG. 1B, the measured fly height 12 is subtracted from the target fly height 16 to generate an error signal e(k) 20 that is adjusted by the first feedforward signal 18 to compensate for the first repeatable disturbance in the fly height. The error signal e(k) 20 is processed by the fly height controller 22 which may include suitable compensation filtering to generate the fly height control signal 8. Also in the embodiment of FIG. 1B, the head 4 comprises a suitable actuator (not shown) for actuating the fly height, such as a suitable heater actuator or a suitable PZT actuator. The fly height estimator (FHE) 10 may employ any suitable technique to measure the fly height, such as by processing the read signal 36 emanating from the head, by processing a gain control signal for adjusting a gain of the read signal 36, or by measuring a capacitance between a surface of the head 4 and the surface of the disk 2.

In the embodiment of FIG. 1A, the disk 2 comprises a number of embedded servo sectors $24_0$-$24_j$ recorded around the circumference of the disk 2 which define a plurality of tracks 26. FIG. 1C shows an embodiment wherein each servo sector $24_i$ comprises a preamble 28 for storing a periodic pattern that enables proper gain adjustment and timing synchronization of the read signal, and a sync mark 30 for storing a special pattern used to symbol synchronize to a servo data field 32. The servo data field 32 stores coarse head positioning information, such as a track address, used to position the head over a target data track during a seek operation. Each servo sector $24_i$ further comprises groups of servo bursts 34 (e.g., A, B, C and D bursts), which comprise a number of consecutive transitions recorded at precise intervals and offsets with respect to a data track centerline. The groups of servo bursts 34 provide fine head position information used for centerline tracking while accessing a data track during write/read operations.

In the embodiment of FIG. 1A, the control circuitry 6 processes the read signal 36 emanating from the head 4 to demodulate the embedded servo sectors $24_0$-$24_j$ and generate a position error signal (PES) representing a radial offset of the head 4 from a target track 26. The control circuitry 6 processes the PES with a suitable servo compensator to generate a control signal 38 applied to a voice coil motor (VCM) 40. The VCM 40 rotates an actuator arm 42 about a pivot in order to actuate the head 4 radially over the disk 2 in a direction that decreases the PES.

In one embodiment, N in feedforward equation 44 of FIG. 1B for generating the feedforward signal 18 represents a number of discrete time intervals over a rotation of the disk 2, and k represents the current time interval for updating the feedforward signal 18. The number of discrete time intervals N may be any suitable number. In one embodiment, N represents the number of servo sectors $24_0$-$24_j$ recorded around the circumference of the disk in each track 26, such that the feedforward signal 18 is updated at each servo sector $24_i$. The number of discrete time intervals N may be more or less than the number of servo sectors, and the feedforward signal 18 may be generated at any suitable time, such as when the control circuitry 6 is processing a servo sector $24_i$ or a data sector during a write or read operation.

In one embodiment, the scalar $n_1$ in the feedforward equation 44 of FIG. 1B is a multiple of a once around frequency of the disk 2. For example, in one embodiment $n_1=1$ such that the feedforward signal 18 compensates for the once around or fundamental frequency of the repeatable disturbance in the fly height. However, the feedforward signal 18 may compensate for any frequency of the repeatable disturbance, and in an embodiment described below, multiple feedforward signals are generated to compensate for multiple repeatable disturbance frequencies.

In an embodiment shown in FIG. 2A, the control circuitry 6 adapts the coefficients $a_1$ and $b_1$ of the feedforward equation 44 according to:

$$a_1(k+1)=a_1(k)-g_1 \cdot e(k) \cdot \cos(2\pi n_1 k/N)$$

$$b_1(k+1)=b_1(k)-g_1 \cdot e(k) \cdot \sin(2\pi n_1 k/N)$$

where $g_1$ is a gain and e(k) comprises a difference between the measured fly height and the target fly height. Any suitable gain $g_1$ may be employed in the embodiments of the present invention to achieve a desired bandwidth while maintaining stability. In one embodiment, a nominal gain is determined for a family of disk drives which may be tuned or adapted for each individual disk drive.

In one embodiment, the control circuitry 6 adapts the coefficients $a_1$ and $b_1$ during a calibration procedure which may be executed one time, such as during manufacturing, or periodically such as every time the disk drive is powered on. In another embodiment, the control circuitry 6 may adapt the coefficients $a_1$ and $b_1$ continuously while the disk drive is operating normally which may help compensate for changes in environmental conditions, such as ambient temperature. In an embodiment shown in FIG. 2B, the control circuitry 6 adapts the coefficients $a_1$ and $b_1$ of the feedforward equation 44 according to:

$$a_1(k+1)=a_1(k)-g_1 \cdot e(k) \cdot \cos(2\pi n_1 k/N+\phi_1)$$

$$b_1(k+1)=b_1(k)-g_1 \cdot e(k) \cdot \sin(2\pi n_1 k/N+\phi_1)$$

where $\phi_1$ represents a phase of the first repeatable disturbance.

FIG. 3A shows an embodiment of the present invention wherein multiple feedforward signals $18_1$-$18_M$ are generated using a number of equations $44_1$-$44_M$ corresponding to a plurality of repeatable disturbance frequencies in the fly height of the head. For example, in one embodiment the control circuitry generates a second feedforward signal according to:

$$a_2 \cdot \cos(2\pi n_2 k/N)+b_2 \cdot \sin(2\pi n_2 k/N)$$

where $a_2$ and $b_2$ are coefficients and $2\pi n_2 k/N$ represents a frequency of a second repeatable disturbance in the fly height of the head. In one embodiment, the control circuitry adapts the coefficients $a_2$ and $b_2$ as shown in FIG. 3B and FIG. 3C in a similar manner described above.

Any suitable repeatable disturbance frequency may be attenuated by the feedforward signals. In one embodiment, $n_1$ is a first multiple of a once around frequency of the disk, and $n_2$ is a second multiple of the once around frequency of the disk, where $n_2$ is greater than $n_1$. For example, in one embodiment $n_1$=1 and $n_2$=2 such that the fundamental frequency and the next harmonic of the repeatable disturbance are attenuated. However, as illustrated in FIG. 3A any suitable number of repeatable disturbance frequencies may be attenuated.

In one embodiment, the coefficients a and b of the feedforward equation (s) are generated for each head/disk combination. In one embodiment, a single set of coefficients a and b may be generated for an entire disk surface, and in another embodiment, multiple sets of coefficients a and b are generated corresponding to multiple radial locations of the disk, such as over multiple zones of the disk surface. As the head transitions into a new zone, the corresponding coefficients a and b are loaded into the feedforward equation (s).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to generate a fly height control signal by:
   measuring a fly height of the head; and
   combining the measured fly height with a target fly height and a first feedforward signal, wherein the first feedforward signal is generated according to:

$$a_1 \cdot \cos(2\pi n_1 k/N)+b_1 \cdot \sin(2\pi n_1 k/N)$$

where $a_1$ and $b_1$ are coefficients and $2\pi n_1 k/N$ represents a frequency of a first repeatable disturbance in the fly height of the head.

2. The disk drive as recited in claim 1, wherein:
   N represents a number of discrete time intervals over a rotation of the disk;
   the first feedforward signal is updated at each time interval; and
   k represents the current time interval.

3. The disk drive as recited in claim 2, wherein:
   the disk comprises a plurality of tracks;
   each track comprises N servo sectors; and
   the first feedforward signal is updated at each servo sector.

4. The disk drive as recited in claim 1, wherein $n_1$ is a multiple of a once around frequency of the disk.

5. The disk drive as recited in claim 1, wherein the control circuitry is further operable to adapt the coefficients according to:

$$a_1(k+1)=a_1(k)-g_1 \cdot e(k) \cdot \cos(2\pi n_1 k/N)$$

$$b_1(k+1)=b_1(k)-g_1 \cdot e(k) \cdot \sin(2\pi n_1 k/N)$$

where $g_1$ is a gain and e(k) comprises a difference between the measured fly height and the target fly height.

6. The disk drive as recited in claim 5, wherein the control circuitry is further operable to adapt the coefficients according to:

$$a_1(k+1)=a_1(k)-g_1 \cdot e(k) \cdot \cos(2\pi n_1 k/N+\phi_1)$$

$$b_1(k+1)=b_1(k)-g_1 \cdot e(k) \cdot \sin(2\pi n_1 k/N+\phi_1)$$

where $\phi_1$ represents a phase of the first repeatable disturbance.

7. The disk drive as recited in claim 1, wherein the control circuitry is further operable to generate a fly height control signal by:
combining the measured fly height with the target fly height, the first feedforward signal, and a second feedforward signal, wherein the second feedforward signal is generated according to:

$$a_2 \cdot \cos(2\pi n_2 k/N)+b_2 \cdot \sin(2\pi n_2 k/N)$$

where $a_2$ and $b_2$ are coefficients and $2\pi n_2 k/N$ represents a frequency of a second repeatable disturbance in the fly height of the head.

8. The disk drive as recited in claim 7, wherein the control circuitry is further operable to adapt the coefficients according to:

$$a_2(k+1)=a_2(k)-g_2 \cdot e(k) \cdot \cos(2\pi n_2 k/N)$$

$$b_2(k+1)=b_2(k)-g_2 \cdot e(k) \cdot \sin(2\pi n_2 k/N)$$

where $g_2$ is a gain and $e(k)$ comprises a difference between the measured fly height and the target fly height.

9. The disk drive as recited in claim 8, wherein the control circuitry is further operable to adapt the coefficients according to:

$$a_2(k+1)=a_2(k)-g_2 \cdot e(k) \cdot \cos(2\pi n_2 k/N+\phi_2)$$

$$b_2(k+1)=b_2(k)-g_2 \cdot e(k) \cdot \sin(2\pi n_2 k/N+\phi_2)$$

where $\phi_2$ represents a phase of the first repeatable disturbance.

10. The disk drive as recited in claim 7, wherein:
$n_1$ is a first multiple of a once around frequency of the disk;
$n_2$ is a second multiple of the once around frequency of the disk; and
$n_2$ is greater than $n_1$.

11. A method of generating a fly height control signal in a disk drive, the disk drive comprising a disk, and a head actuated over the disk, the method comprising:
measuring a fly height of the head; and
combining the measured fly height with a target fly height and a first feedforward signal, wherein the first feedforward signal is generated according to:

$$a_1 \cdot \cos(2\pi n_1 k/N)+b_1 \cdot \sin(2\pi n_1 k/N)$$

where $a_1$ and $b_1$ are coefficients and $2\pi n_1 k/N$ represents a frequency of a first repeatable disturbance in the fly height of the head.

12. The method as recited in claim 11, wherein:
N represents a number of discrete time intervals over a rotation of the disk;
the first feedforward signal is updated at each time interval; and
k represents the current time interval.

13. The method as recited in claim 12, wherein:
the disk comprises a plurality of tracks;
each track comprises N servo sectors; and
the first feedforward signal is updated at each servo sector.

14. The method as recited in claim 11, wherein $n_1$ is a multiple of a once around frequency of the disk.

15. The method as recited in claim 11, further comprising adapting the coefficients according to:

$$a_1(k+1)=a_1(k)-g_1 \cdot (k) \cdot \cos(2\pi n_1 k/N)$$

$$b_1(k+1)=b_1(k)-g_1 \cdot e(k) \cdot \sin(2\pi n_1 k/N)$$

where $g_1$ is a gain and $e(k)$ comprises a difference between the measured fly height and the target fly height.

16. The method as recited in claim 15, further comprising adapting the coefficients according to:

$$a_1(k+1)=a_1(k)-g_1 \cdot e(k) \cdot \cos(2\pi n_1 k/N+\phi_1)$$

$$b_1(k+1)=b_1(k)-g_1 \cdot e(k) \cdot \sin(2\pi n_1 k/N+\phi_1)$$

where $\phi_1$ represents a phase of the first repeatable disturbance.

17. The method as recited in claim 11, further comprising:
combining the measured fly height with the target fly height, the first feedforward signal, and a second feedforward signal, wherein the second feedforward signal is generated according to:

$$a_2 \cdot \cos(2\pi n_2 k/N)+b_2 \cdot \sin(2\pi n_2 k/N)$$

where $a_2$ and $b_2$ are coefficients and $2\pi n_2 k/N$ represents a frequency of a second repeatable disturbance in the fly height of the head.

18. The method as recited in claim 17, further comprising adapting the coefficients according to:

$$a_2(k+1)=a_2(k)-g_2 \cdot e(k) \cdot \cos(2\pi n_2 k/N)$$

$$b_2(k+1)=b_2(k)-g_2 \cdot e(k) \cdot \sin(2\pi n_2 k/N)$$

where $g_2$ is a gain and $e(k)$ comprises a difference between the measured fly height and the target fly height.

19. The method as recited in claim 18, further comprising adapting the coefficients according to:

$$a_2(k+1)=a_2(k)-g_2 \cdot e(k) \cdot \cos(2\pi n_2 k/N+\phi_2)$$

$$b_2(k+1)=b_2(k)-g_2 \cdot e(k) \cdot \sin(2\pi n_2 k/N+\phi_2)$$

where $\phi_2$ represents a phase of the first repeatable disturbance.

20. The method as recited in claim 17, wherein:
$n_1$ is a first multiple of a once around frequency of the disk;
$n_2$ is a second multiple of the once around frequency of the disk; and
$n_2$ is greater than $n_1$.

* * * * *